Patented May 16, 1933

1,909,388

UNITED STATES PATENT OFFICE

GÉZA ZEMPLÉN, OF BUDAPEST, HUNGARY, ASSIGNOR TO TRES GYOGYSZER-VEGYESZETI IPARI ES KERESKEDELMI V. T., OF BUDAPEST, HUNGARY, A CORPORATION

PRODUCTION OF TETRA-ACYL-GLYCOCHOLYL THUJYLAMINES

No Drawing. Application filed October 28, 1929, Serial No. 403,124, and in Hungary November 8, 1928.

The invention relates to a medicinal substance uniting the healing effects of glycocholic acid and thujylamine and to processes for uniting the two basic substances named into a compound substance. This is realized according to the invention by bringing the chloride of glycocholic acid into reaction with thujylamine. This reaction would in itself take place easily, but its practical carrying into effect is cumbersome owing to the difficulties of producing the acid chloride of glycocholic acid, glycocholic acid with its three free hydroxyls being a substance requiring very delicate handling, as these free hydroxyls will easily become chlorinated when producing the chloride.

In order to eliminate this difficulty, the following procedure is adopted: The hydroxyls of the glycocholic acid are first fixed by means of acyl groups, e. g. by means of acetyl groups, which causes the imide group likewise to be acylated or respectively acetylated. The tetra-acyl-glycocholic acid thus obtained can then be transformed, without any difficulty, by means, e. g. of thionylchloride, into a chloride of tetra-acyl-glycocholic acid, e. g. into chloride of tetra-acetyl-glycocholic acid:

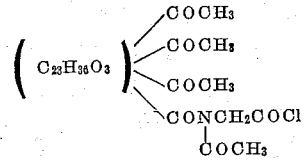

By treating chloride of tetra-acyl-glycocholic acid with thujylamine, there is produced tetra-acyl-glycocholyl-thujylamine, e. g. tetra-acetyl-glycocholyl-thujylamine:

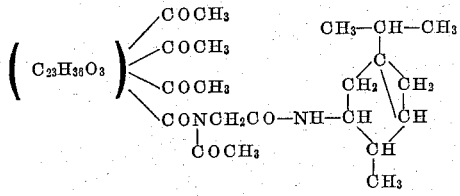

while the hydrochloride of thujylamine is simultaneously formed as a by-product of the reaction.

In what follows, the manufacture of tetra-acetyl-glycocholic-thujylamine is described by way of example.

Example (a) *Production of tetra-acetate of glycocholic acid.*—10 grams of glycocholic acid are heated in a water-bath together with 40 cc. of anhydride of acetic acid and 10 grams of water-free acetate of sodium during one hour; the whole mass of solid substance will become dissolved at an early stage of its being heated. Subsequently, the reaction mixture is poured into water, and on the next day, replacing the motherlye repeatedly by fresh water, the product is brought into the form of a powder, drained off, washed out with the aid of water and dried. The substance resulting is a white powder, weighing 9 grams, and the melting point of which is 145° C.

The same product is obtained from glycocholic acid when subjected to the action of either anhydride of acetic acid and pyridine, or acetyl chloride and pyridine. In an entirely analogous manner it is also possible to produce the other acyl compounds of glycocholic acid.

(b) *Production of chloride of tetra-acetyl-glycocholic acid.*—5 grams of tetra-acetate of glycocholic acid are dissolved in chloroform, 5 cc. of thionylchloride are added and the whole left to stand at room temperature during half an hour; following which the thionylchloride and the solvent are distilled off in a vacuum, whilst the residue of oil is dissolved in 5 cc. of chloroform and the chloride of acid precipitated by means of petrol ether. The product obtained after drying in a vacuum, is a powder of light yellow colour; its melting point is 164° C.

(c) *Production of tetra-acetyl-glycocholyl-thujylamine.*—2 grams of chloride of tetra-acetyl-glycocholic acid are dissolved in 10 cc. of absolute chloroform and a solution of 0.5 grams of thujylamine in 10 cc. of chloroform added thereto, and the mixture left to stand during 6 hours at room temperature. From the reaction mixture the chloride of thujylamine formed is then washed out with the aid of water, the chloroform solution dried by means of chloride of calcium and repeatedly distilled off with alcohol in a vacuum. The residue is the product desired. Its characteristics are the following: It is a light brown substance. Its melting point is 91–92° C. It is dissolved by chloroform and by benzol. It dissolves with difficulty in ethyl alcohol, methyl alcohol, ether, acetone and carbon bisulphite. It is non-soluble in petrol ether and in olive oil.

What I claim is:

1. A new medicinal product, consisting of the amide combination of tetra acylated glycocholic acid with thujylamine.

2. A new medicinal product consisting of the amide combination of tetra-acetyl-glycocholic acid with thujylamine.

3. A process for producing a medicinal substance combining the healing effects of glycocholic acid and thujylamine, which consists in bringing tetra acylated chloride of glycocholic acid into reaction with thujylamine.

4. A process for producing a medicinal substance combining the healing effects of glycocholic acid and thujylamine characterized by bringing the chloride of tetra-acetyl-glycocholic acid into reaction with thujylamine, and thus producing tetra-acetyl-glycocholyl-thujylamine.

GÉZA ZEMPLÉN.